United States Patent [19]
Cordes et al.

[11] Patent Number: 4,927,434
[45] Date of Patent: May 22, 1990

[54] GAS COMPONENT EXTRACTION

[75] Inventors: Harry D. Cordes, Largo; Michael B. Duich, Palm Harbor; Gardner S. Bailey, Pinellas Park, all of Fla.

[73] Assignee: Pall Corporation, Glen Cove, N.Y.

[21] Appl. No.: 285,162

[22] Filed: Dec. 16, 1988

[51] Int. Cl.$^5$ ............................................. B01D 53/04
[52] U.S. Cl. ........................................ 55/20; 55/21; 55/26; 55/58; 55/62; 55/68; 55/75; 55/162; 55/163; 55/179; 55/274; 55/389
[58] Field of Search ................... 55/18, 20, 21, 25, 26, 55/58, 62, 68, 74, 75, 161–163, 179, 274, 387, 389

[56] References Cited
U.S. PATENT DOCUMENTS

| | | | |
|---|---|---|---|
| 3,922,149 | 11/1975 | Ruder et al. | 55/21 |
| 4,197,095 | 4/1980 | White, Jr. et al. | 55/21 X |
| 4,231,768 | 11/1980 | Seibert et al. | 55/179 |
| 4,323,370 | 4/1982 | Leitgeb | 55/18 |
| 4,349,357 | 9/1982 | Russell | 55/21 |
| 4,351,649 | 9/1982 | Owens et al. | 55/163 X |
| 4,428,372 | 1/1984 | Beysel et al. | 55/21 X |
| 4,479,815 | 10/1984 | Tinker et al. | 55/179 X |
| 4,496,376 | 1/1985 | Hradek | 55/179 X |
| 4,516,424 | 5/1985 | Rowland | 55/21 X |
| 4,543,109 | 9/1985 | Hamlin et al. | 55/179 X |
| 4,545,790 | 10/1985 | Miller et al. | 55/179 X |
| 4,546,442 | 10/1985 | Tinker | 55/179 X |
| 4,561,287 | 12/1985 | Rowland | 55/21 X |
| 4,627,860 | 12/1986 | Rowland | 55/179 X |
| 4,648,888 | 3/1987 | Rowland | 55/21 |
| 4,681,602 | 7/1987 | Glenn et al. | 55/21 |
| 4,687,013 | 8/1987 | Stevenson | 55/163 X |
| 4,698,075 | 10/1987 | Dechene | 55/179 X |
| 4,718,020 | 1/1988 | Duich et al. | 55/20 X |
| 4,732,587 | 3/1988 | Koch | 55/179 X |
| 4,783,205 | 11/1988 | Searle | 55/163 X |

FOREIGN PATENT DOCUMENTS

| | | |
|---|---|---|
| 0129304 | 12/1984 | European Pat. Off. . |
| 0225736 | 6/1987 | European Pat. Off. . |
| 2066693 | 7/1981 | United Kingdom .................. 55/163 |

Primary Examiner—Robert Spitzer
Attorney, Agent, or Firm—Leydig, Voit & Mayer

[57] ABSTRACT

A pressure swing apparatus includes two sorption beds, one of which extracts a component from an inlet gas mixture while the other bed is regenerated. Valves are provided for controlling the flow of the inlet gas mixture to each of the sorption beds and for venting the beds during regeneration. Sensors are provided for repetitively sensing ambient pressure and the temperature and pressure of the inlet gas mixture. A microprocessor repeatedly samples the measured temperature and pressures and repetitively calculates adsorption and purging intervals, altering the adsorption and purging intervals by controlling the valve actuations to respond in real time to changes in the conditions of the ambient and the inlet gas and thereby to optimize the production of a product gas from an inlet gas of limited supply and widely varying in temperature and pressure. The invention may be applied in aircraft to produce a breathable gas mixture.

23 Claims, 4 Drawing Sheets

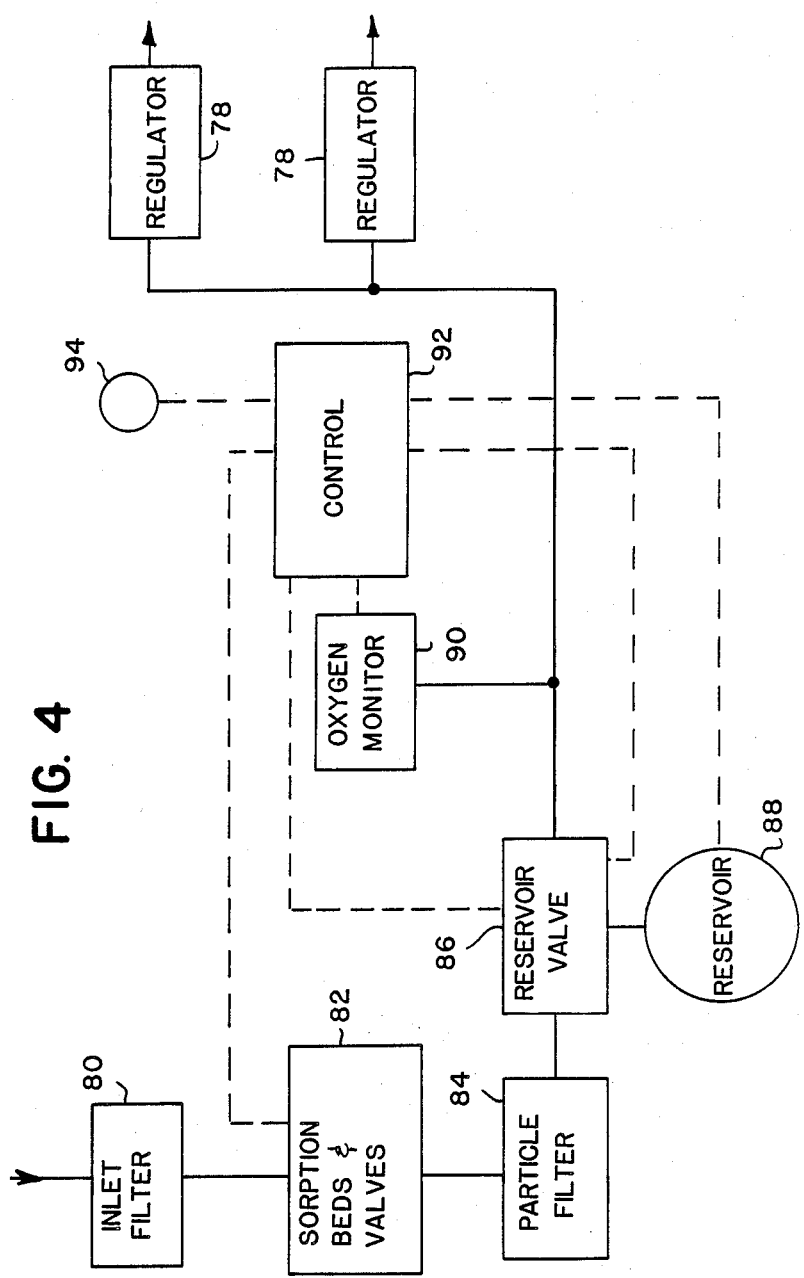

GAS COMPONENT EXTRACTION

TECHNICAL FIELD:

The present invention concerns apparatus for extracting one component from a gas mixture with sorption beds that adsorb the component and are regenerated after adsorbing the component. In particular, the invention relates to alternately operating one sorption bed to adsorb the component and produce a product gas from which the component is extracted while regenerating a second sorption bed. The operation and regeneration intervals of the sorption beds are controlled in the invention to optimize the product gas output for a gas mixture supply. The apparatus may be advantageously employed to produce an oxygen-enriched breathable gas from air for the crew of an aircraft.

BACKGROUND OF THE INVENTION

Crew members flying moderate to high altitude aircraft, particularly high performance military aircraft, must be provided with a breathable gas mixture containing a higher concentration of oxygen than is available from ambient air at the altitude of flight. Traditional aircraft breathing systems employ compressed gases or liquid oxygen supply carried aboard the aircraft from which the breathable gas is derived.

In recent years, sorption techniques have been employed to produce a breathable gas mixture from ambient air. Because air at the altitudes of concern contains insufficient oxygen for crew members, sorption beds that preferentially adsorb nitrogen are employed to produce the breathable mixture. Ambient air that is compressed by an aircraft engine or an auxiliary compressor is supplied to the sorption apparatus where a sorption material, typically a molecular sieve, preferentially adsorbs nitrogen while allowing oxygen and the other components of air, principally argon, to pass through. Molecular sieve sorption beds can readily produce a product gas containing more than 94% oxygen. Appropriate molecular sieve materials are commercially available, such as type 5A produced by Union Carbide Corporation and Bayer A.G. and type 13X, also available from Union Carbide Corporation. These molecular sieves are well known in pressure swing adsorption technology.

In pressure swing adsorption technology, a sorption bed is effective in adsorbing a component of a gas when a gas mixture is supplied under pressure to the bed. Eventually, during the operation of the sorption bed, the bed becomes filled with the adsorbed component and adsorption performance declines. A sorption bed is regenerated, i.e., its adsorptive efficiency is restored, by releasing the gas pressure and flushing the bed, usually in a reverse flow direction, with some of the product gas produced by another bed. The reverse flow of oxygen encourages desorption of adsorbed nitrogen. The regeneration process thus includes a depressurizing step and a purging step.

The adsorption characteristics of a sorption bed material, i.e., the effectiveness of the adsorption over time, depend upon the pressure and temperature of the gas mixture supplied. Likewise, the desorption or regeneration characteristics of a sorption bed depend upon the pressure within the bed. For a particular sorption bed material those adsorption and regeneration characteristics can be determined by laboratory measurements.

In a typical application of the apparatus providing a breathable gas mixture for the crew of an aircraft, the inlet gas mixture is air, pressurized by and bled from one of the aircraft engines. This pressurized air is further conditioned, i.e., its temperature is reduced and aerosols (small liquid particles) and particulates filtered out, for use in crew-occupied spaces on an aircraft or in the breathable gas generation system described herein.

The quantity of bleed air available for onboard oxygen generation is limited. Moreover, its pressure and temperature is subject to relatively wide swings. In conventional apparatus, sorption beds having a capacity to accommodate the highest pressure/lowest temperature inlet gas situation are employed. While these beds can handle the maximum expected inlet gas mixture flow rate, much of the time the beds are not being fully used. The excess capacity means that those beds are relatively large and heavy, both critical disadvantages in an aircraft application.

Therefore, it would be desirable to provide a sorption bed apparatus and method that respond to changes in inlet gas temperature and pressure to optimize the performance of sorption beds. By responding to inlet gas condition changes, the size and weight of the beds could be reduced, while the performance of the smaller beds in the production of product gas from a limited supply of inlet gas is optimized.

SUMMARY OF THE INVENTION

It is an object of the present invention to provide a relatively small and lightweight apparatus for extracting one component from an inlet gas mixture to produce a product gas mixture.

Another object of the invention is the provision of an apparatus for maximizing the efficiency of a sorption apparatus so that an optimum quantity of a product gas can be derived from a limited supply of an inlet gas, over a wide range of inlet gas conditions.

Still another object of the invention is the provision of an apparatus for extracting a component from a gas mixture employing sorption beds wherein the intervals of adsorption and purging during regeneration of the beds are determined and controlled based on the conditions of the inlet gas, ambient pressure, and the adsorption and desorption characteristics of the sorption bed material in order to optimize product gas production.

Yet another object of the invention is repeated sampling of the conditions of the inlet gas, and of the ambient pressure, correspondingly determining and changing the intervals of adsorption and purging to optimize the production of a product gas to meet or exceed an established quality standard.

According to an embodiment of the invention, at least two sorption beds are provided each of which includes an inlet and outlet for the flow of gas therethrough and a respective inlet and vent valve connected at the inlet of each bed. Sensors are provided for measuring ambient pressure and the temperature and pressure of the inlet gas supplied to the inlet valves. The apparatus includes a control unit that responds to the measured ambient pressure and temperature and pressure of the inlet gas and that, from knowledge of the characteristics of the sorption bed material, determines adsorption and purging intervals for the bed that optimize product gas output. The control unit actuates the inlet and vent valves so that one bed is operational and produces a desired product gas while the other sorption bed is being regenerated at relatively low pressure with a backward flow of product gas in a variable quantity determined by the control unit. In a preferred embodiment, the control unit comprises a microprocessor that repetitively samples the inlet gas conditions and the ambient pressure, determines optimum current adsorption and purge intervals, and implements the currently determined intervals.

BRIEF DESCRIPTION OF THE DRAWINGS:

FIG. 4 is a block diagram illustrating a particular application of the invention.

DETAILED DESCRIPTION OF PREFERRED EMBODIMENTS:

The invention is described with reference to certain preferred embodiments without limiting the scope of the invention. In all figures, like elements are given the same reference numbers. The foregoing and following description places particular emphasis upon using the invention in aircraft for producing an oxygen-enriched, breathable gas mixture. However, the invention is not limited to that environment and may be employed in other applications such as sorption bed drying.

Figure 1:
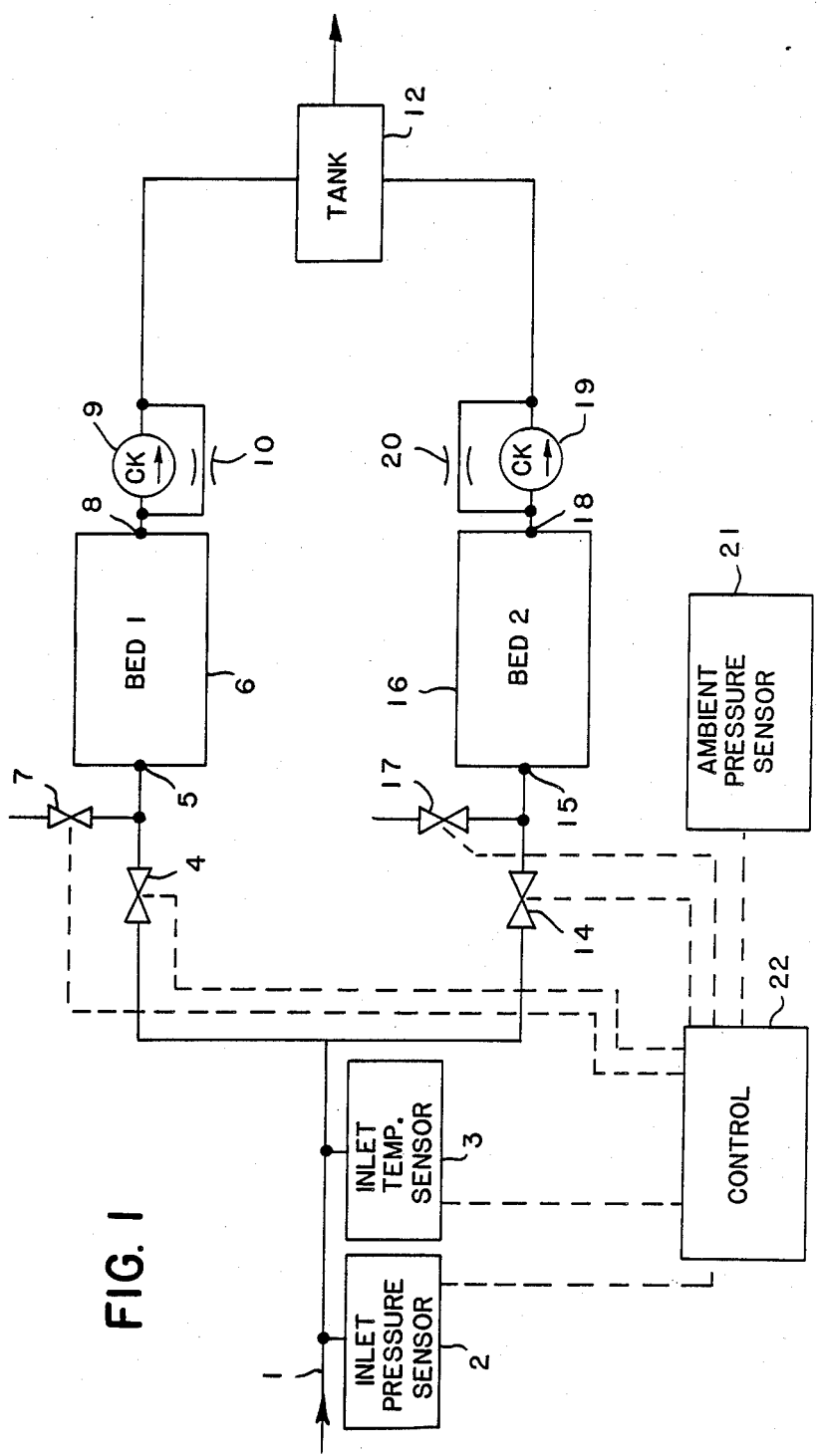
FIG. 1 is a schematic diagram of a gas component extraction apparatus according to an embodiment of the invention.

Turning to FIG. 1, an embodiment of an apparatus according to the invention is shown in a block diagram, schematic form. That apparatus includes an inlet conduit 1 through which a pressurized inlet gas mixture is supplied to the apparatus. That mixture may be conditioned bleed air from an aircraft engine. The bleed air may be conditioned by drying, filtering, and/or other steps before being supplied to conduit 1. The pressure and temperature of the gas applied through conduit 1 are respectively sensed by a pressure sensor 2 and a temperature sensor 3. Those sensors are of conventional construction and produce analog electrical signals as indications of the gas mixture pressure and temperature. Pressure sensor 2 is a conventional strain gauge type semiconductor pressure sensor. Temperature sensor 3 may be a resistance temperature detector (RTD).

The conduit 1 divides into two identical legs. In one of them an inlet valve 4, preferably a pneumatically piloted solenoid actuated diaphragm valve, controls the flow of the inlet gas to an inlet 5 of a sorption bed 6. A vent valve 7 is also connected to the inlet 5 of sorption bed 6 for venting the bed during the regeneration process. Valve 7 is also preferably a pneumatically piloted, solenoid actuated diaphragm valve. During the adsorption operation of bed 6, valve 4 is open and valve 7 is closed. Inlet gas flows into bed 6 through inlet 5 and product gas flows out through an outlet 8. Outlet 8 is connected through a check valve 9 to a reserve tank 12 containing a volume of the product gas. Check valve 9 allows gas to flow from bed 6 to tank 12, but prevents backflows into bed 6 through outlet 8. A bypass 10 containing a flow restricting element, such as an orifice, is pneumatically connected in parallel with check valve 9. Bypass 10 allows a restricted flow of product gas into and out of sorption bed 6 through outlet 8 and is used in the regeneration of bed 6 as described below.

The sorption bed arrangement in the lower half of FIG. 1 is identical to that in the upper half. Like elements are identified by similar reference numerals increased by ten. An inlet valve 14 selectively supplies the inlet gas mixture to inlet 15 of sorption bed 16. A vent valve 17 connected to inlet 15 is employed in the regeneration of bed 16. Bed 16 includes an outlet 18 connected to a check valve 19. The product gas generated by sorption bed 16 is supplied through check valve 19 to tank 12. A bypass 20 containing a flow restricting element is pneumatically connected in parallel with check valve 19 to allow a backflow of product gas to sorption bed 16 while that bed is being regenerated. Tank 12 functions as a reservoir and also smooths surges in the pressure of the product gas that may be produced, for example, when a bed is taken out of adsorption service to be regenerated. Tank 12 includes an outlet conduit for transporting the product gas to other devices, such as regulators and/or breathing masks for aircraft crew members.

The arrangement of FIG. 1 is highly schematic and drawn to aid understanding of the invention. Sorption beds 6 and 16 need not be geometrically identical nor spaced apart. For example, those beds could be mounted concentrically in separate, adjacent chambers, as described in published European Patent Application No. 0 225 736.

In addition to the sensors and valving for the inlet and product gas, a pressure sensor 21 for measuring the ambient pressure is provided. Like sensor 2, pressure sensor 21 is preferably a conventional strain gauge type semiconductor pressure sensor.

The apparatus of FIG. 1 includes a control unit 22 that is in electrical communication with sensors 2, 3, and 21 as well as with the solenoids that actuate valves 4, 7, 14, and 17. (The dashed lines of FIG. 1 indicate electrical connections while the solid lines indicate fluid connections.) Control unit 22 receives the electrical signals from the sensors and employs them in calculations for controlling the adsorption and regeneration operations of the sorption bed apparatus. Control unit 22 responds by actuating valves 4, 7, 14, and 17, opening or closing them in the course of a gas component extraction process.

Beds 6 and 16 operate together in a cycle of variable duration. During one part of the cycle bed 6 is operational, adsorbing a gas component and producing product gas. During a different part of the cycle bed 16 is adsorbing and producing product gas. That is, one bed is in service during part of the cycle and during that part of the cycle the other bed is off-line. During part of the time a bed is offline, it is regenerated by being depressurized, i.e., exposed to ambient pressure, and product gas is allowed to purge it by flowing through the bed in a backward direction, i.e., into the outlet and out through an opened vent valve. The backward flow of product gas aids the desorption by the bed of the adsorbed gas component to complete the regeneration process. Regeneration of an offline bed may begin immediately after a bed is taken out of service or may be delayed for an interval after the inlet valve to the bed has been closed. The duration of the cycle, the variable adsorption intervals of the beds, the variable regeneration intervals, and the timings of the intervals are determined and implemented by control unit 22 in response to sensed data and stored adsorption and regeneration characteristic data.

At one point in an operation bed 6 may be adsorbing. Valve 4 is open and valve 7 is closed so that an inlet gas mixture is supplied to bed 6 where one component of the gas mixture is being adsorbed. The product gas flows through check valve 9 toward tank 12. At the end of the adsorption interval of bed 6, as determined by control unit 22, valve 4 is closed. Subsequently, valve 7 is opened to vent, i.e., depressurize bed 6. Bed 6 reaches a pressure at or near that of the ambient. That pressure may be below atmospheric when valve 7 is vented at a high altitude. About the same time that bed 6 is taken out of service, bed 16 is put into operation by the opening of valve 14 and begins adsorbing a component of the inlet gas mixture. The product gas bed 16 produces flows to tank 12 through check valve 19. After depressurization of bed 6, some of the product gas flows through bypass 10 and through bed 6, in a direction opposite the flow during adsorption, and out open valve 7. That reverse flow of purging gas occurs because of the high pressure of the product gas compared to the ambient beyond open valve 7. The flowing product gas purges adsorbed gas from bed 6. Thus, the regeneration process includes a depressurization step followed by a purge step. At the conclusion of the purge step, valve 7 is closed. If bed 16 continues to produce product gas before bed 6 is brought back into operation, that product gas pressurizes bed 6 through bypass 10. Eventually bed 16 is taken out of adsorption service for regeneration by the closing of valve 14 and bed 6 is placed back into adsorbing operation by opening valve 4. All of these actions in one cycle are implemented by control unit 22.

Besides receiving the sensor signals, control unit 22 also stores the characteristics of the sorbent material employed in sorption beds 6 and 16. Control unit 22 includes a calculational capability for predicting the performance of the sorbent beds while adsorbing a component of a gas mixture under pressure and for predicting the degree of regeneration of the beds when depressurized and purged. These calculations are made based upon the information provided to control unit 22 by sensors 2, 3, and 21 and the stored sorption bed characteristics. Most preferably, control unit 22 includes a microprocessor and associated programmable read-only memories.

Figure 2:
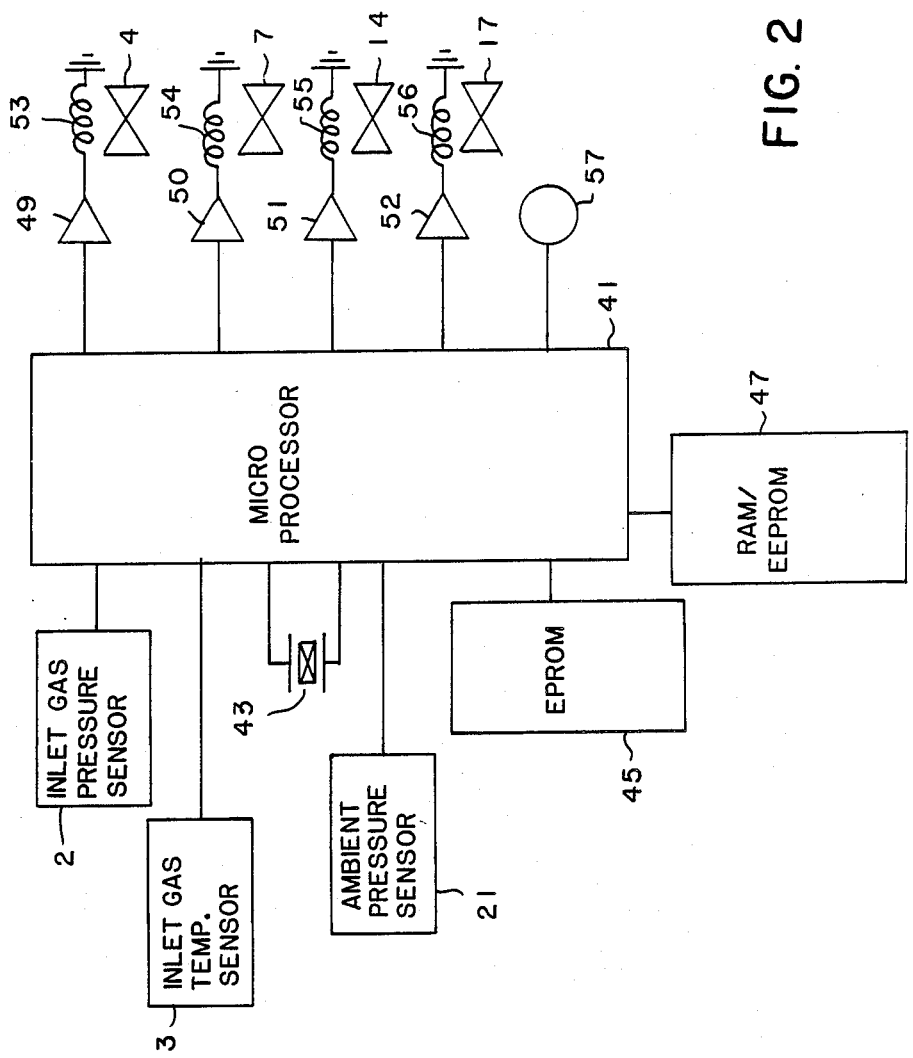
FIG. 2 is an electrical schematic diagram of a control unit according to an embodiment of the invention.

In FIG. 2 an arrangement of a microprocessor 41, associated sensors 2, 3, and 21, a frequency control 43, memories 45 and 47, and valves 4, 7, 14, and 17 with associated buffers and pneumatic controls 49–56 is schematically shown. Microprocessor 41 may be a conventional, commercially available microprocessor such as an Intel 8097. That type of microprocessor is particularly advantageous because it includes an eight channel multiplexer and a successive approximation analog-to-digital converter so that the multiple analog signals provided by the various sensors are easily converted to a digital format. In addition, microprocessor 41 linearizes the response of the sensors. The clock rate of the microprocessor is controlled by an external frequency control, shown as a crystal 43, for controlling the frequency of the basic oscillator within the microprocessor. Memory 45 is a programmable read-only memory (EPROM) for storing the program executed by microprocessor 41. The adsorption and regeneration characteristics of the sorption bed material as a function of ambient pressure and inlet gas mixture pressure and temperature are stored in memory 45 for use in the valve control calculations carried out by microprocessor 41. Memory 47 is a static random access memory including an electrically erasable programmable read-only memory (RAM/EEPROM) in which calibration data for the sensors and fault code information are stored. Memory 47 also provides a scratch pad for computations.

As a result of the calculations performed by microprocessor 41 employing stored and sensed information, valves 4, 7, 14, and 17 are actuated to carry out the desired product gas production process. These valves typically employ solenoids that admit air to a diaphragm to actuate the valve. As indicated in FIG. 2, output signals generated by microprocessor 41 are passed to buffer amplifiers 49, 50, 51, and 52, respectively, and thereafter to solenoid coils 53, 54, 55, and 56, respectively. Those solenoids admit pressurized air to actuate valves 4, 7, 14, and 17 of the preferred construction. In addition, microprocessor 41 includes a built-in test program for determining the proper operation of the electronics each time power is applied to the microprocessor and for periodically monitoring the status of the sensors. For example, when a sensor produces a signal that is outside a reasonable range, the sensor is assumed to have failed. The microprocessor then ignores the sensor signal and substitutes a worst case, extreme value as the sensor signal. This response ensures continued production of product gas, but at a reduced efficiency. If a catastrophic failure is detected, the program defaults to a predetermined status for the valves. In either case, a status signal is produced and supplied to an indicator 57 as a warning of the existence of a failure and, possibly, its severity. Warning 57 may be a light that is illuminated upon the occurrence of a failure. In addition, a fault code is stored in a non-volatile memory for subsequent identification of the source of the failure. In the latter event, in the course of regular maintenance of the apparatus, the fault code discloses the abnormality that has occurred so that appropriate maintenance procedures can be carried out. Preferably, a catastrophic failure provides an immediate warning so that action can be taken. For an aircraft, the needed action may be switching to a backup supply of breathable air or a descent to an altitude where the oxygen content of the ambient air is acceptable.

Figure 3:
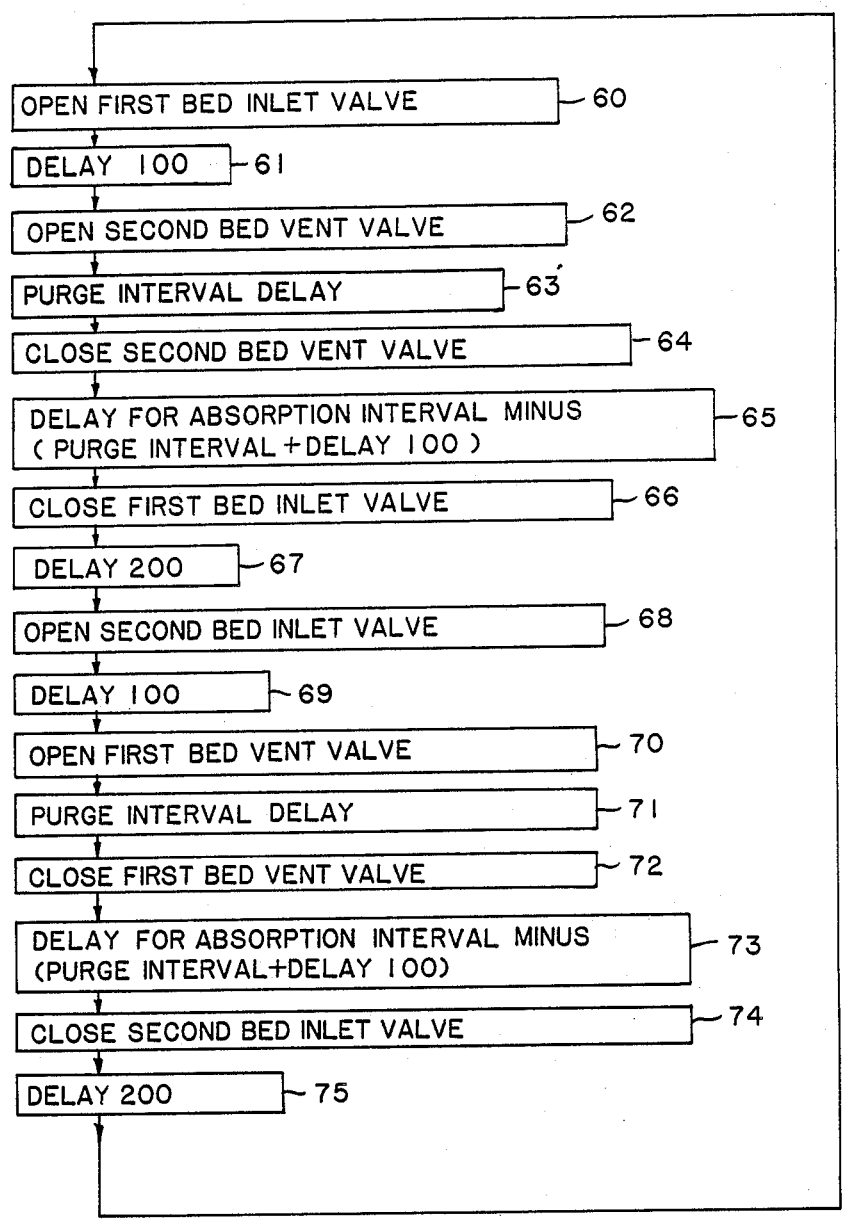
FIG. 3 is a valve sequencing chart according to an embodiment of the invention.

FIG. 3 is a flow diagram illustrating a valve operating sequence consisting of steps 60 through 75. An adsorption process for a first bed begins at step 60 where the inlet valve is open and ends at step 66 where that inlet valve is closed. In between those steps, there is a variable length delay 100 at step 61 after which the regeneration process for the second bed begins with the opening of its vent valve in step 62. That valve remains open during a purging interval 63 and is closed in step 64. During this purging interval the first bed is continuing to adsorb a gas component. That adsorption continues until the expiration of the delay interval of step 65, namely, the total adsorption interval less the sum of the purge interval and the initial delay of step 61. A further delay 200 takes place between the adsorption operations of the first and second beds at step 67. Certain of the delays are numbered in FIG. 3 for identification, but those identifying numbers are no indication of the duration of the delays. In fact, in accordance with the invention, all of the delays are variable in duration and the durations are determined by control unit 22 as hereinafter described to optimize performance.

After the completion of a variable length delay 200 in step 67, the sequence of steps 60–66 are repeated as steps 68–74, but with the first and second beds interchanged. Thereafter, at step 75 after a delay corresponding to the delay of step 67, the sequence returns to step 60 and is repeated. In this preferred valve sequencing operation, calculated changes in the optimum adsorption and purge intervals based on updated information on the pressure and temperature of the inlet gas mixture can be implemented at the end of any delay interval. That is, at the beginning and end of the various steps, control unit 22 can make adjustments in the timing of the valve sequencing to ensure optimum production of product gas in the adsorption/regeneration cycle. Other valving sequences can be employed. For example, while FIG. 3 shows sequential adsorption intervals for the separate beds, in some situations the adsorption intervals could overlap in time. In that case, for example, delay 200 in the FIG. 3 flow chart would be negative.

The operation of the valves under the control of unit 22 ensures that the optimum quantity of product gas is generated when the inlet gas is subject to relatively wide swings in temperature and pressure and when its quantity is limited. For example, in an application in an aircraft, the nominal average quantity of compressed air available as a bleed gas from an engine may be limited to 1.5 lbs/min. It is therefore of substantial importance that an optimum quantity of a breathable gas mixture be produced from a limited quantity, highly variable source. That result is achieved in the invention by controlling and changing the adsorption and purge intervals in response to changes in ambient pressure and in the pressure and temperature of the inlet gas mixture.

In various applications of the invention, different tests can be applied in determining the adsorption and purging intervals depending upon the mode of operation. Two examples of operational modes, both for producing breathable air for aircraft crews, are described below. In the first example, it is assumed that the product gas flowing out of the sorption beds is supplied directly to the crew members without dilution. In order to meet crew needs, the product gas must contain at least a specified oxygen content and be provided at a specified minimum flow rate. That oxygen content is expressed in terms of a partial pressure of oxygen which, for example, may be 200 mm Hg and a typical minimum flow rate may be 100 standard liters per minute (slpm). In order to select the appropriate adsorption and purge intervals to be employed at any particular time, time intervals $t_0$, $t_1$, $t_2$, $t_4$, and $t_5$ are repeatedly calculated by the control unit in response to repeated measurements of the ambient pressure and of the conditions of the inlet gas. Time interval $t_3$ is also employed in determining the appropriate adsorption and purging intervals.

$t_0$ is the minimum adsorption interval.

In each cycle of the apparatus a certain amount of the inlet gas is wasted, i.e., none of it becomes product gas. For example, when one bed is taken offline it contains a quantity of inlet gas. When that bed is vented, the inlet gas flows out without having produced product gas. A shorter cycle time means more frequent valve operation, including venting, and more lost, i.e., unused, inlet gas. That is, more gas is consumed, both in producing product gas and in waste, as the cycle time is shortened. When the quantity per unit time of inlet gas is limited, at a certain adsorption interval, $t_0$, all of the inlet gas that is allocated to the extraction apparatus is consumed. Therefore, the adsorption interval, i.e., the duration of adsorption service by each bed in one cycle, cannot be shorter than $t_0$.

$t_1$ is the purging interval required to purge a bed with a quantity of product gas that exceeds the minimum purging quantity required for efficient regeneration by a predetermined excess amount, e.g., 20 percent, plus the time needed for operating the valves. $t_1$ fixes the minimum time interval for adsorption by one bed while another bed is being purged with the specified excess over the minimum quantity of product gas necessary for efficient regeneration. Regeneration efficiency depends upon the pressure swing of the beds, here the difference between the inlet gas pressure and the ambient pressure, and the quantity of purging gas that flows. The purging gas flow rate is a function of inlet pressure. Thus, the purging interval determines the quantity of purging gas that flows. Control unit 22 can calculate the purging interval, taking into account the required quantity of purge gas, from the stored bed characteristics and sensed pressures, that restores a bed to a specified degree of adsorption performance. As used here, the term efficient regeneration refers to purging that is just sufficient to restore a bed to that specified degree of adsorption performance.

$t_2$ is the adsorption interval that will produce a sufficent quantity of product gas to purge the offline regenerating bed with a specified excess quantity of product gas, e.g., 1.2 times the minimum quantity of product gas needed for efficient regeneration, and simultaneously produce product gas containing a minimum specified partial pressure of a desired component at a specified minimum flow rate. $t_2$ establishes an upper limit for the adsorption interval.

$t_3$ is the minimum adsorption interval allowable. The minimum allowable adsorption interval is fixed for a particular apparatus configuration and may be, for example, about 3 seconds. Different values of $t_3$ apply to different apparatus configurations.

$t_4$ is the interval required to purge a regenerating bed with the minimum quantity of product gas for efficient regeneration plus the time needed for operating the valves. $t_4$ is similar to $t_1$ except that the minimum quantity of product gas for efficient regeneration is assumed in calculating $t_4$, rather than the excess that is assumed in calculating $t_1$.

$t_5$ is the adsorption interval that will produce a sufficient quantity of product gas to purge the offline regnerating bed with the minimum quantity of product gas necessary for efficient regeneration and simultaneously produce product gas with the minimum specified partial pressure of a desired component at the specified minimum flow rate. $t_5$ establishes an upper limit for adsorption interval.

Time intervals $t_0$, $t_1$, $t_2$, $t_4$, and $t_5$ are calculated in control unit 22 by retrieving the stored sorbent bed material characteristics which are a function of the ambient pressure and the temperature and pressure of the inlet gas. Those characteristics predict the quantity and quality of the product gas that is produced for various ambient pressures and inlet gas conditions, taking into account the geometry and the size of the particular sorbent beds employed. Those characteristics allow the calculation of the time intervals $t_0$, $t_1$, $t_2$, $t_4$, and $t_5$, taking into account the declining efficiency of the sorbent material as the adsorption process is carried out and the effectiveness of the regeneration process. Thus, the length of the adsorption interval can be chosen based upon a computation that shortens or lengthens that interval so that the optimum quantity of acceptable quality product gas is obtained. In the invention, control unit 22 automatically and repetitively determines the adsorption and purge intervals based on each set of calculated values for $t_0$, $t_1$, $t_2$, $t_4$, and $t_5$, and $t_3$ to optimize product gas production. In the determinations, $t_4$ and $t_5$ are used at extreme operating conditions (i.e., low inlet gas pressure, high inlet gas temperature, high ambient pressure) where the difficulty in obtaining the required performance is the greatest.

The choice of the adsorption interval is made based upon the calculated value of $t_2$, the maximum adsorption interval when an extended purge can be carried out during regeneration. That choice is desirable to obtain superior adsorption performance. Interval $t_2$ is calculated, as described above, based upon the characteristics of the inlet gas supply to the apparatus for extraction of a component. If that value, $t_2$, is greater than or equal to the maximum of $t_0$, $t_1$, and $t_3$, then an adsorption interval of that length will provide an operational cycle and $t_2$ is chosen as the adsorption interval. That choice means that one bed can adsorb a component from the inlet gas while another bed completes an entire regeneration process including purging with an excess quantity of product gas. In that case, the purge portion of the regeneration process is set equal to $t_1$ less the valve opening and closing times. If $t_2$ is not greater than or equal to the maximum of $t_0$, $t_1$, and $t_3$, then the control unit establishes as the adsorption interval the maximum of $t_3$, $t_4$, and $t_5$. This selection assures that the adsorption interval at least equals the minimum allowable interval and, if possible, sets the adsorption interval to exceed the purge interval when the minimum quantity of product gas for efficient regeneration is employed in the purge. In this case, the purge interval is set equal to $t_4$ less the valve opening and closing time.

The foregoing example concerns, for an application for the crew of an aircraft, the supplying of a breathable gas directly to the crew members. When inlet gas supply and conditions permit the production of an excess quantity of product gas, that excess product gas can be stored in a reservoir for later use while the remainder of the currently produced product gas is supplied to crew members. Whether the product gas can be stored also depends upon its pressure, the pressure of the gas already stored in the reservoir, and the quality of the product gas. In this example, a diluting regulator is usually employed that dilutes the product gas so that a gas mixture of desired concentration reaches the crew members.

In this second example, intervals $t_0$ through $t_6$ are initially calculated. Intervals $t_0$, $t_1$, $t_3$, and $t_4$ have the same definitions as the corresponding intervals in the first example. Intervals $t_1$ and $t_4$ are calculated in the same way as the corresponding times described above for the first example. In this example, in which the product gas may charge a reservoir and is diluted to provide a breathable gas mixture, the time $t_2$ is different from that of the preceding example. In this second example, a required minimum flow rate to the diluting regulator of an assumed minimum quality, e.g., 93% oxygen content, and to the reservoir are specified. These desired flows are used to calculate an interval $t_2$, which is an adsorption interval that produces the desired flow assuming that an excess volume of product gas is employed in purging regenerating beds. In a specific example, 120 percent of the minimum quantity of product gas necessary for efficient regeneration of a bed is employed to purge a regenerating bed. The calculated value of $t_2$ is thus the maximum adsorption interval for a single bed while the reservoir is being charged. An interval $t_5$ is calculated as the adsorption interval when the required flow rate is provided to the diluting regulators, but without charging the reservoir, assuming that an excess quantity of product gas over that required for efficient regeneration is employed in purging a regenerating sorption bed. This interval $t_5$ is the maximum adsorption interval when the reservoir is not being filled. An interval $t_6$ is also calculated which is similar to $t_5$, except that the purge step of the regeneration process employs only the minimum needed volume of product gas to purge a regenerating bed efficiently.

Because this second example includes the additional option of charging a reservoir, the determination of an adsorption interval from the intervals $t_0$ through $t_6$ is more complicated than in the first example. A sensor for measuring the pressure of the product gas flowing from the beds and another sensor for measuring the pressure of the product gas in the reservoir may be needed. That pressure information is important in the selection of the adsorption and purging intervals. However, since those sensors (which are not shown in FIG. 1) measure pressure directly, they do not increase the complexity of the apparatus excessively.

If $t_2$, an adsorption time when the reservoir is being charged and excess purge quantities are employed, is greater than or equal to the maximum of $t_0$, $t_1$, and $t_3$, and the pressure in the reservoir is less than the pressure of the product gas, then $t_2$ is chosen as the adsorption interval. The purge interval is then chosen equal to $t_1$ less the valve switching time. In this mode of operation the reservoir can be filled. If, on the other hand, $t_2$ is not at least equal to the maximum of $t_0$, $t_1$, and $t_3$, or the pressure of the product gas does not exceed the pressure in the reservoir, a secondary test is applied. If $t_5$ is greater than or equal to the maximum of $t_0$, $t_1$, and $t_3$, then sufficient product gas can be produced to supply breathing needs, even though there may not be sufficient excess product gas to charge the reservoir. The adsorption interval is then established as $t_5$ and the purge interval is established at $t_1$ minus the valve switching time, the same purge interval as in the prior situation of this second example. Both of the foregoing situations assume purging with an excess quantity of product gas. If $t_5$ is not at least equal to the maximum of $t_0$, $t_1$, and $t_3$, then an adsorption interval of $t_5$ will not provide a workable cycle. In that case, to optimize product gas production, only the minimum quantity of product gas is used in the purging step. The adsorption interval is thus set to the maximum of $t_0$, $t_4$, and $t_6$. As in the first example, this cycling arrangement ensures that the regeneration process takes no more time than the adsorption process. In this third situation, the purge interval is set to $t_4$ less the valve switching time. In this third and default option of the second example, the product gas reservoir cannot be filled.

The two examples described do not exhaust the methods of applying the invention. However, those examples demonstrate the utilization of the sorption beds with a limited and highly variable supply of the inlet gas mixture to maximize the efficiency of the sorption process and optimize the production of product gas even at extreme air and gas pressures and temperatures. While the two examples have each explained a single determination of an adsorption interval, the calculations and determinations are made repetitively in real time in the apparatus. For example, ambient pressure and the temperature and pressure of the inlet gas mixture may be measured twenty times per minute with corresponding determinations of optimized adsorption and purge intervals. The intervals actually employed are changed, usually at the end of a valve state change, to continually optimize bed efficiency and product gas generation. The two examples have also described apparatus employing two sorption beds that are alternatively operated and regenerated. The invention can also be applied to apparatus including more than two sorption beds.

Because the invention responds to changes in ambient pressure and the temperature and pressure of the inlet gas, its product gas production is optimized. That is, for particular capacity beds, the maximum possible quantity of product gas can be produced. Bed capacity need not be chosen to be large enough to handle the maximum expected inlet gas mixture flow. Instead, smaller, lighter beds can be employed to produce quantities of product gas that are comparable to those produced by much larger beds. This result can be achieved because, at large inlet gas mixture flows, the adsorption interval and cycle time are shortened, pressing the beds to perform at their maximum adsorption rates. At lower inlet gas flow rates, the adsorption interval is lengthened. Again, the beds are pressed to maximum performance for the conditions, but with emphasis on longer adsorption intervals rather than on maximum adsorption rates.

Application of the novel apparatus and method may require auxiliary equipment. FIG. 4 shows a block diagram of the invention used in a breathable air supply system for an aircraft crew. This system includes two breathing masks (not shown) each of which is fed by a separate breathing regulator 78. Breathing regulators 78 supply product gas directly to the masks or mix the product gas with a diluting gas depending upon the selected operational mode. At the inlet side of the apparatus, a filter 80 is employed to remove aerosols and particulates from air, in this case conditioned air bled from the engine of the aircraft. The filtered gas mixture is supplied to a concentrator 82, which is the dual bed sorption apparatus described in detail above. The product gas is supplied to a particulate filter 84 which removes any particles of the sorption bed that are carried from the bed by the flowing gas. The flowing product gas is delivered to a reservoir valve 86 which controls the flow of product gas into and out of a reservoir 88. Reservoir 88 provides a backup supply of product gas to supplement or supplant the product of concentrator 82, if necessary.

An oxygen monitor 90 may be employed to monitor the quality of the product gas being supplied to the breathing regulator 78. That oxygen purity information is supplied to control unit 92 which comprises the microprocessor and associated circuitry described above. The dashed lines in FIG. 4 indicate electrical connections for supplying information to control unit 92 and for controlling the various valves. Thus, control unit 92 can determine the pressure in reservoir 88 and the purity and pressure of the product gas to determine whether product gas can be added to the reservoir or should be withdrawn from it to supplement other product gas being produced. Likewise, the control unit 92 may actuate breathing regulators 78, possibly in response to crew member choices, so that product gas is supplied directly to the masks or is mixed with a diluting gas mixture. Control unit 92 also includes a system failure warning indicator 94, such as a light, to warn the crew of a catastrophic failure of the system requiring descent of the aircraft to an altitude where breathable air is available before the product gas stored in reservoir 88 is exhausted.

The invention has been described with respect to certain preferred embodiments. Various modifications and additions will occur to those of skill in the art. Accordingly, the scope of the invention is limited solely by the following claims.

We claim:

1. A method of optimizing the production of a product gas mixture in a pressure swing apparatus including two regenerable sorbent beds from an inlet gas mixture from which the sorbent beds extract a component to produce the product gas mixture comprising:

extracting a component from a pressurized inlet gas mixture by passing it through a first sorbent bed during an adsorption interval thereby producing a product gas mixture;

regenerating a second sorbent bed during the adsorption interval of the first sorbent bed including passing a quantity of the product gas from the first sorbent bed through the second sorbent bed in a reverse direction during a purging interval while the second sorbent bed is vented to the ambient;

alternating the first and second beds between adsorption and regeneration operations;

sensing the ambient pressure and the temperature and pressure of the pressurized inlet gas mixture;

determining from the sensed ambient pressure and the temperature and pressure of the pressurized inlet gas mixture and from the sorption characteristics of the sorbent beds the length of adsorbing and purging intervals that optimize the production of product gas; and adjusting the adsorption and purging intervals of the first and second sorption beds to the respective determined intervals that optimize the production of product gas.

2. The method of claim 1 including determining the length of the adsorption interval by calculating from the ambient pressure and the temperature and pressure of the pressurized inlet gas mixture and from the sorption characteristics of the beds, an adsorption interval that will produce a product gas containing at least a specified minimum partial pressure of a desired component, at at least a minimum specified flow rate when a regenerating bed is purged with a predetermined quantity of product gas exceeding the minimum quantity of the product gas required for efficient regeneration, and establishing that interval as the adsorption interval unless it is shorter than the interval required to purge a bed with the predetermined quantity of product gas exceeding the minimum quantity of product gas required for efficient regeneration.

3. The method of claim 1 including determining the length of the adsorption interval by calculating from the ambient pressure and the temperature and pressure of the pressurized inlet gas mixture and from the sorption characteristics of the beds, an adsorption interval that will produce a product gas containing at least a specified minimum partial pressure of a desired component, at at least a minimum specified flow rate when a regenerating bed is purged by a predetermined quantity of product gas substantially equal to the minimum quantity of the product gas required for efficient regeneration, and establishing that interval plus a fixed duration valve actuation time as the adsorption interval unless it is shorter than the interval required to purge a bed with the predetermined quantity of product gas substantially equal to the minimum quantity of product gas required for efficient regeneration of the bed and, if shorter, establishing the interval required to purge a bed with the predetermined quantity of product gas substantially equal to the minimum quantity of product gas required for efficient regeneration as the adsorption interval.

4. The method of claim 1 including repetitively sampling the ambient pressure and the temperature and pressure of the pressurized inlet gas mixture and repetitively determining an adsorption interval from the sensed temperature and pressures and the sorption characteristics of the sorption beds and repetitively altering the adsorption interval when a changed adsorption interval is determined.

5. An apparatus for extracting a component from a gaseous mixture comprising:
   first and second sorption beds, each bed having an inlet for admitting gas and an outlet for discharging gas, said beds for, in an operating condition, adsorbing a component from an inlet gas mixture and supplying as a product gas the mixture from which the component has adsorbed, and for, in a regenerating condition, desorbing the adsorbed component;
   an inlet conduit for supplying the inlet gas mixture to said inlets of said first and second beds;
   first and second inlet valves connected between said inlet conduit and said inlets of said first and second beds, respectively, for selectively admitting the inlet gas mixture to said first and second beds;
   first and second vent valves in fluid communication with said first and second beds, respectively, for venting said first and second beds to the ambient;
   means for admitting product gas from one bed in an operating condition to the other bed in a regenerating condition to purge said other bed;
   first and second sensors in fluid communication with said inlet conduit for sensing the pressure and temperature, respectively, of the inlet gas mixture supplied to said first and second inlet valves;
   a third sensor for sensing ambient pressure proximate said first and second beds; and
   control means, storing the sorption characteristics of said first and second beds as a function of ambient pressure and temperature and pressure of the inlet gas mixture, for determining, in response to said first, second, and third sensors and the sorption characteristics of said first and second beds, intervals for adsorption by and purging of said first and second beds and for actuating said first and second inlet and vent valves for cycling said first and second beds between operating and regenerating conditions in accordance with the determined adsorption and purging intervals to optimize the production of product gas for the sensed inlet gas mixture and ambient conditions.

6. The apparatus of claim 5 wherein said control means comprises a microprocessor.

7. The apparatus of claim 6 wherein said control means includes memory means accessible by said microprocessor for storing the adsorption and desorption characteristics of said first and second beds as a function of pressure and temperature.

8. The apparatus of claim 5 wherein said means for admitting product gas comprises first and second check valves connected to the outlets of said first and second sorption beds, respectively, and first and second flow restricting bypass means pneumatically connected across said first and second check valves, respectively.

9. The apparatus of claim 5 including means for testing said sensors and control means for failures.

10. The apparatus of claim 9 including a fault status indicator for indicating a failure in said sensors and control means.

11. The apparatus of claim 10 wherein said fault status indicator includes means for storing a fault code disclosing the source of a failure.

12. The apparatus of claim 5 including a tank receiving product gas from the outlets of said first and second beds for smoothing surges of pressure in the product gas.

13. The apparatus of claim 5 wherein said control means includes means for repetitively sensing the ambient pressure and the temperature and pressure of the inlet gas and for repetitively determining and altering the adsorption and purging intervals.

14. An apparatus for supplying a breathable gas mixture to aircraft crew members from compressed air comprising:
   first and second sorption beds, each bed having an inlet for admitting gas and an outlet for discharging gas, respectively, said beds for, in an operating condition, adsorbing nitrogen from air and supplying an oxygenenriched mixture as a product gas, and for, in a regenerating condition, desorbing adsorbed nitrogen from said beds;
   an inlet conduit for supplying the inlet gas mixture to said inlets of said first and second beds;
   first and second inlet valves connected between said inlet conduit and said inlets of said first and second beds, respectively, for selectively admitting the inlet gas mixture to said first and second beds;
   first and second vent valves in fluid communication with said first and second beds, respectively, for venting said first and second beds;
   means for admitting product gas from one bed in an operating condition to the other bed in a regenerating condition to purge said other bed;
   first and second sensors in fluid communication with said inlet conduit for sensing the pressure and temperature, respectively, of the air supplied to said first and second inlet valves;
   a third sensor for sensing ambient pressure proximate said first and second beds; and
   control means, storing the sorption characteristics of said first and second beds as a function of ambient pressure and temperature and pressure of the air, for determining, in response to said first, second, and third sensors and the sorption characteristics of said first and second beds, intervals for adsorption by and purging of said first and second beds and for actuating said first and second inlet and vent valves for cycling said first and second beds between operating and regenerating conditions in accordance with the determined adsorption and purging intervals to optimize the production of product gas for the sensed inlet air and ambient conditions.

15. The apparatus of claim 14 wherein said control means comprises a microprocessor.

16. The apparatus of claim 15 wherein said control means includes memory means accessible by said microprocessor for storing the adsorption and desorption characteristics of said first and second beds as a function of pressure and temperature.

17. The apparatus of claim 14 wherein said means for admitting product gas comprises first and second check valves connected to outlets of said first and second sorption beds, respectively, and first and second flow restricting bypass means pneumatically connected across said first and second check valves, respectively.

18. The apparatus of claim 14 including means for testing said sensors and control means for failures.

19. The apparatus of claim 18 including a fault status indicator for indicating a failure in said sensors and control means.

20. The apparatus of claim 19 wherein said fault status indicator includes means for storing a fault code disclosing the source of a failure.

21. The apparatus of claim 14 including a tank receiving product gas from the outlets of said first and second beds for smoothing surges of pressure in the product gas.

22. The apparatus of claim 14 wherein said control means includes means for repetitively sensing the ambient pressure and the temperature and pressure of the air and for repetitively determining and altering the adsorption and purging intervals.

23. The apparatus of claim 14 including a filter for removing aerosols and particulates from the inlet gas mixture.

* * * * *